United States Patent
Bowler et al.

[11] 3,819,235
[45] June 25, 1974

[54] ANTI-LOCK BRAKE SYSTEM

[75] Inventors: Lauren L. Bowler, Bloomfield Hills; Laird E. Johnston, Birmingham, both of Mich.

[73] Assignee: General Motors Corporation, Detroit, Mich.

[22] Filed: Oct. 30, 1972

[21] Appl. No.: 302,097

[52] U.S. Cl............................ 303/21 F, 188/181 A
[51] Int. Cl.............................................. B60t 8/12
[58] Field of Search............ 303/21, 10; 188/181 R, 188/181 A

[56] References Cited
UNITED STATES PATENTS

| | | | |
|---|---|---|---|
| 3,576,351 | 4/1971 | Collins.............................. | 303/21 F |
| 3,588,191 | 6/1971 | Atkin et al. ........................ | 303/21 F |
| 3,588,193 | 6/1971 | Drutchas........................... | 303/21 F |

Primary Examiner—Milton Buchler
Assistant Examiner—Paul E. Sauberer
Attorney, Agent, or Firm—Herbert Furman

[57] ABSTRACT

A brake system includes an operator actuated direct apply brake valve which channels fluid from a pump to the wheel brakes. An extremal anti-lock controller includes a transmission governor providing a fluid pressure equal to the average rear wheel speed and an accumulator which receives and stores fluid from the governor. Return of fluid from the accumulator to the governor during wheel deceleration is through a deceleration orifice which restricts the flow to a rate corresponding to the equivalent of braking under optimum conditions and thereby provides a pressure differential equivalent to the difference between the actual wheel velocity and the predetermined maximum wheel velocity during braking under optimum conditions. This pressure differential operates a control valve interposed between the apply valve and wheel brakes which exhausts brake pressure to release the brakes. A period of wheel acceleration follows the brake release and during the resulting wheel speed recovery the accumulator is recharged and the control valve shifts to recommunicate the apply valve to the brakes. An acceleration valve senses the wheel speed recovery permitted by the brake release and closes a hold valve which maintains the brake pressure at its then existing magnitude to provide the hold mode of the extremal cycle. When the wheel speed recovery ends, the acceleration valve and hold valve are shifted and the apply valve is recommunicated to the brakes to initiate the brake apply mode of the extremal cycle. A thermostatic valve disables the anti-lock control system when oil temperature is below a predetermined temperature at which fluid viscosity impairs system function. A cycle valve exercises the anti-lock system each time the transmission is shifted out of reverse into neutral or drive.

3 Claims, 4 Drawing Figures

ANTI-LOCK BRAKE SYSTEM

This invention relates to an anti-lock brake control system and more particularly to an extremal or peak seeking hydraulic anti-lock brake control system.

It is well known that the brake torque which can be supported by the tire-to-road friction peaks at a certain wheel slip ratio and at this brake sustaining capacity decreases as the wheel slip ratio increases from the peak value. It has therefore been found desirable to cycle the brake apply pressure and accordingly the brake torque in accordance with the conditions existing at the tire and road interface so that the wheel is not permitted to be decelerated beyond the rate which would result in such an increase in wheel slip as to substantially lessen the retarding force or torque exerted between the tire and the road surface.

It is known to provide a peak seeking or extremal control system in which a brake system sufficient to cause substantially increasing wheel slip is released to permit acceleration and consequent decreasing wheel slip. The brake apply pressure is then held at a value permitting wheel acceleration and continued decrease in wheel slip while maintaining some brake torque on the wheel until the acceleration ceases. The brake apply pressure is then again increased to cause wheel deceleration. This cycle is repeated as necessary to seek out the wheel slip ratio which provides optimum tire-to-road friction.

U.S. Pat No. 3,441,320 by D. M. Flory utilizes a rotary inertia weight to sense positive and negative wheel accelerations and position control valves which in turn control differential pressures acting on a brake pressure modulator to release, hold, and reapply vehicle brakes. U.S. Pat. No. 3,554,612 by J. L. Harned utilizes an electronic control system which compares a wheel acceleration signal to a variable reference signal and operates the brake pressure modulator to release hold and reapply the wheel brakes and thereby maintain an optimum brake torque.

The present invention provides an anti-lock control system of the extremal type consisting wholly of hydraulically controlled and operated components and utilizing the transmission governor as a velocity and acceleration sensor and the sole input to the system.

The vehicle brake system includes a direct apply brake valve which upon actuation channels pressure fluid from the transmission pump or other pump directly to the wheel brakes for actuation. The invention utilizes the pressure output of a transmission governor as the sole input signal. The transmission governor is of the type having a multi-stage pressure versus speed characteristic so as to provide a nearly linear relationship between wheel speed and the governor output pressure. The governor output pressure or wheel speed pressure signal charges an accumulator which stores therein a volume of fluid at the governor pressure. When the wheels decelerate during braking, fluid is discharged from the accumulator through a deceleration orifice. The orifice is sized to permit flow therethrough at a rate which slightly exceeds the flow rate equivalent to the rate of decrease of governor pressure during optimum vehicle braking under optimum wheel-to-road interface conditions. When the vehicle wheels decelerate at a rate in excess of this known optimum rate, the pressure differential results across the deceleration orifice. This pressure differential between the reference pressure in the accumulator and the governor pressure is applied across the control valve which is shifted by the pressure differential to an extent linearly proportional to the pressure differential. Shifting of the control valve isolates the rear wheel brakes from the direct apply brake valve and exhausts the rear brake pressure to initiate the brake release mode of the extremal anti-lock cycle. A period of rear wheel acceleration follows the brake pressure release and during the resulting rear wheel speed recovery the accumulator is recharged. An acceleration valve senses the rear wheel speed recovery permitted by the brake release and closes a hold valve which isolates the rear wheel brakes from the control valve to maintain the rear wheel brake pressure at its then existing magnitude to provide the hold mode of the extremal cycle. Upon recharging of the accumulator, the differential between the accumulator and governor pressures is decreased and a spring shifts the control valve to reapply pressure from the direct apply brake valve to the rear wheel brakes. As the wheel speed recovers to near that of the vehicle, the acceleration of the wheel is slowed and the acceleration valves shifts and opens the hold valve so that the direct apply brake valve pressure is communicated to the rear wheel brakes to initiate the reapplication of brake pressure. The extremal release hold and reapply cycle is repeated until the vehicle is brought to a stop or the excessive brake application is relieved.

Figure 1:
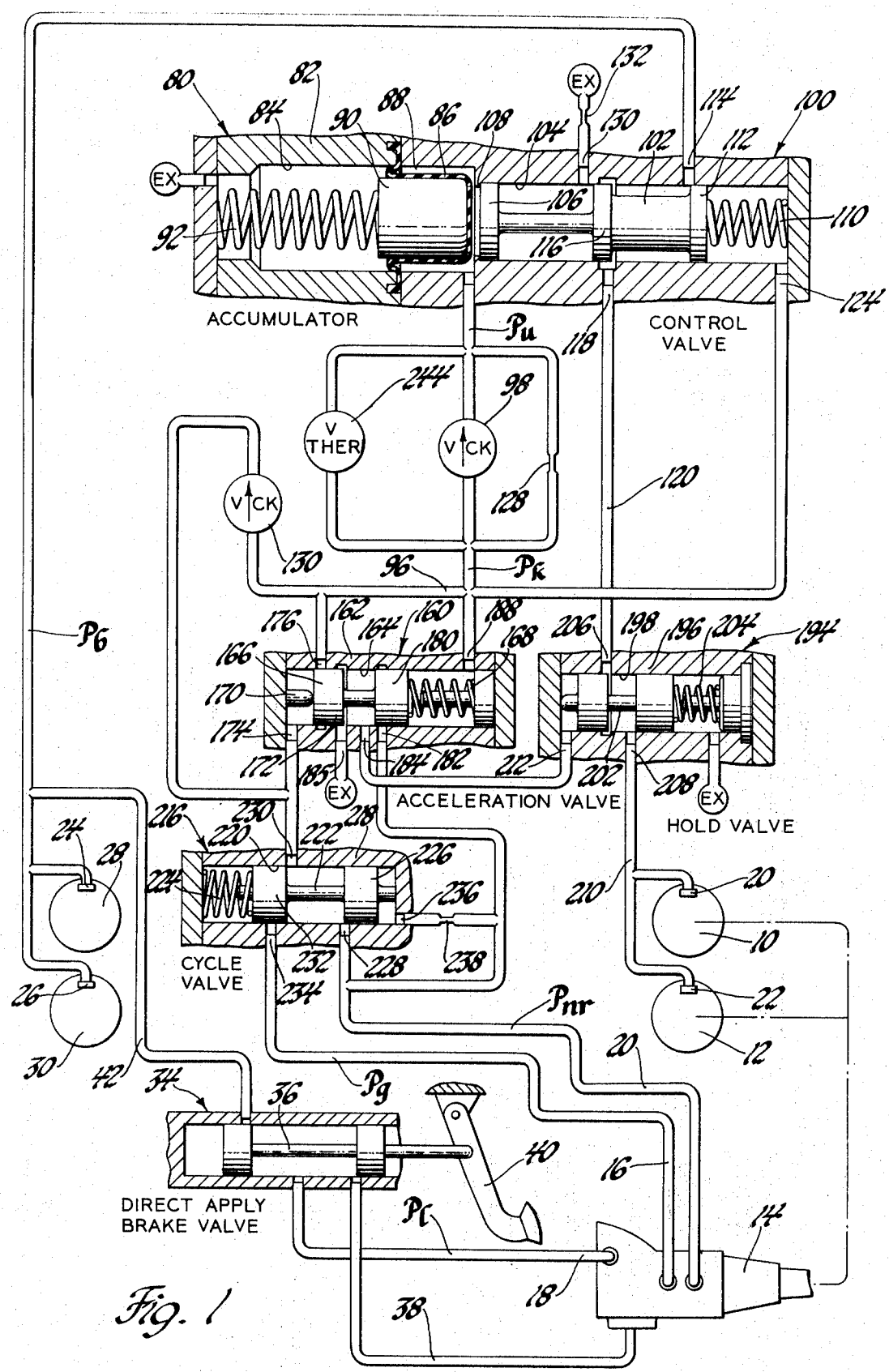
FIG. 1 is a schematic illustration of a vehicle brake system embodying the invention and having parts broken away and in section.

With reference to FIG. 1, a motor vehicle includes rear wheels 10 and 12 connected in a conventional manner through a differential and drive shaft, not shown, to the output shaft of an automatic transmission 14. The transmission 14 includes a transmission governor connected to the output shaft so as to be driven at the average speed of the rear wheels and thereby provide in conduit 16 a fluid pressure signal proportional to the average speed of the wheels 10 and 12. The transmission governor is of the type disclosed in copending patent application Ser. No. 185,086, now U.S. Pat. No. 3,718,377 having a two-stage pressure versus speed characteristic so as to provide a nearly linear relationship between wheel speed and governor pressure. The governor output pressure or average wheel pressure signal in conduit 16 is hereinafter referred to as Pg. The automatic transmission 14 also includes a pump connected to the input shaft of the transmission and providing a fluid pressure conduit 18 which is hereinafter referred to as pressure Pl. The automatic transmission 14 also includes a hydraulic shift control circuit which provides a so-called "not reverse" pressure, hereinafter referred to as Pnr, which equals the line pressure Pl, in conduit 20 when the car is shifted out of reverse into neutral or a drive range.

The brake system of the vehicle includes conventional wheel brakes 20 and 22 respectively associated with the rear wheels 10 and 12 and conventional wheel brakes 24 and 26 associated with the front wheels 28 and 30. Application of the brake pressure to the wheel brakes is by a direct apply brake valve, indicated generally at 34 which is shown in FIG. 1 in brake release condition wherein the valve spool 36 of the direct apply brake valve 34 communicates transmission line pressure $Pl$ in conduit 18 to the sump of the automatic transmission 14 via conduit 38. The direct apply brake valve 34 is actuated by a conventional brake pedal 40 which shifts the valve spool 36 leftwardly to restrict communication of conduit 18 $Pl$ to exhaust conduit 38 and open communication of $Pl$ to conduit 42. Conduit 42 communicates the brake pressure, hereinafter referred to as $Pb$, directly to the front wheel brakes 24 and 26 and through a logic circuit as will be described hereinafter to the rear wheel brakes 20 and 22.

In general, the hydraulic logic circuit of the brake in the lock system includes an accumulator 80 which stores a volume of fluid at a pressure $Pg$ proportional to average rear wheel speed; a deceleration orifice 128 through which oil is returned from the accumulator to the governor during wheel deceleration at a maximum rate corresponding to the known maximum rate of wheel deceleration without wheel lock-up; a control valve 100 which moves in linear proportion to the differential between governor and accumulator pressure and in so moving restricts communication of $Pb$ to rear wheel brakes 20 and 22 and exhausts the brake pressure from the rear wheel brakes 20 and 22; a hold valve 194 which closes to isolate the rear wheel brakes from the control valve 100 to provide the hold mode of the anti-lock cycle, and an acceleration valve 160 which senses wheel acceleration and closes the hold valve 194 when the wheel is accelerated and opens the hold valve 194 when the wheel is decelerating. The logic system also includes a thermostatic valve which bypasses the deceleration orifice 128 during low temperature operating conditions in which the viscosity of the fluid restricts its flow through the orifice, and a cycle valve which upon shifting of the transmission from reverse into neutral or a drive range cycles the accumulator, acceleration valve, and hold valve to exercise these elements of the anti-lock control system.

ACCUMULATOR, CONTROL VALVE AND DECELERATION ORIFICE

The accumulator 80 includes a housing 82 having a bore 84 therein. A diaphragm 86 has its periphery engaged in the housing 82 and forms therewith an accumulator chamber 88. A piston 90 supports the central portion of diaphragm 86 and is biased to its rightward position of FIG. 1 by a spring 92. The wheel velocity pressure signal $Pg$ is communicated to chamber 88 of the accumulator 80 via $Pg$ conduit 16, the acceleration valve 160 to be described hereinafter, the conduit 96 and a check valve 98. $Pg$ moves the diaphragm 86 of the accumulator 80 leftwardly to store in the accumulator a volume of fluid at a pressure proportional to the average rear wheel speed. The accumulator 80 exhibits a nearly linear displacement of diaphragm 86 proportional to the wheel speed since $Pg$ is itself a nearly linear function of the average wheel speed. Thus, diaphragm 86 velocity and the oil flow rate into the accumulator will be proportional to the wheel acceleration. Likewise the diaphragm 86 velocity and the oil flow rate out of the accumulator will be proportional to the wheel deceleration.

The deceleration orifice 128 bypasses check valve 98 to allow fluid return from the accumulator chamber 80 to the transmission governor during wheel deceleration. The fluid return path is from chamber 88 into conduit 96 and through a check valve 130 to $Pg$ conduit 16 and the governor. The orifice 128 is selected to permit fluid flow therethrough at a flow rate corresponding to a 1.5g wheel deceleration; a deceleration level slightly greater than that which the vehicle experiences during braking on the highest encountered road friction coefficient without attaining wheel slip in excess of that which provides a peak brake torque sustaining capability. Accordingly, when the vehicle wheels decelerate at a rate causing return of fluid from accumulator 80 to the governor at a rate less than the maximum flow rate through the deceleration orifice 128, the accumulator pressure, hereinafter referred to as $Pu$, will fall in synchronism with $Pg$. However, when the vehicle wheels decelerate at a rate causing $Pg$ to decrease at a rate in excess of the flow threshold of the deceleration orifice 128, the deceleration orifice 128 restricts flow of the accumulator 80 causing $Pu$ to decrease at a lesser rate than the wheel speed pressure $Pg$. Thus, it is seen that when excessive brake torque causes $Pg$ to decrease at a rate which $Pu$ cannot follow through deceleration of orifice 128, $Pu$ becomes a gradually decreasing reference pressure equal to the optimum wheel speed profile. Thus, the pressure differential between $Pu$ and the pressure conduit 96, hereinafter referred to as $Pk$, is equivalent to the velocity differential between the optimum wheel velocity and the actual wheel velocity then existing. This pressure differential operates the control valve 100.

CONTROL VALVE

Control valve 100 includes a valve spool 102 which is sealingly slidable in a bore 104 of housing 82. Land 106 of spool 102 forms a wall of the accumulator chamber 88 and is normally urged into engagement of a stop surface 108 of the housing 82 by a spring 110. In this normal position of spool 102, a land 112 of spool 102 permits communication of brake pressure $Pb$ in conduit 42 through an inlet port 114 of control valve 100 while a land 116 of spool 102 opens a port 118 to communicate $Pb$ to a conduit 120 and then through hold valve 194 as will be described hereinafter to the wheel brakes 20 and 22. The conduit 96 pressure $Pk$ is communicated through a port 124 to the rightward end of valve spool 102. It will thus be seen that spool 102 is normally pressure balanced by the equal pressures $Pu$ and $Pk$ acting on the ends thereof and is held in the leftward position of FIG. 1 by spring 110. When the pressure differential between $Pu$ and $Pk$ exceeds the nominal preload of spring 110, equivalent to about 2 psi, the control valve spool 102 moves rightwardly in proportion to the difference between the average wheel speed pressure $Pg$ or $Pk$ and the reference speed pressure $Pu$. This movement of spool 102 is the integral of the relative wheel acceleration flow rate out of the accumulator 80. Rightward shifting of spool 102 in response to a wheel deceleration in excess of the orifice 128 threshold causes land 116 to block communication of $Pb$ at inlet port 114 to port 118 and opens a flow path for brake pressure at the rear wheel brakes 20 and 22 through the hold valve 194, conduit 120 and control valve 100 to an outlet port 130 connected to an exhaust orifice 132. Brake pressure at the wheel is thus exhausted at a predetermined rate through the exhaust orifice 132 to initiate the brake release mode of the anti-lock cycle.

The deceleration orifice 128 operates consistently at the design flow rate since the spool 102 moves rightwardly to an extent providing a pressure differential between the opposed acting Pu and Pk which is equal to the force of the spring 110 times the end area of the spool 102.

ACCELERATION VALVE

Charging of the accumulator 80 with Pg is through the acceleration valve 160. Acceleration valve 160 includes a housing 162 having a bore 164 in which a valve spool 166 is sealingly slidable. A spring 168 urges valve spool 116 to its leftward position engaging stop 170 as shown in FIG. 1. In this position, land 172 blocks communication of Pg from inlet port 174 to the outlet port 176 which is connected to Pk conduit 96. A second land 180 of spool 166 blocks communication of Pnr from inlet port 182 to outlet port 184 and communicates outlet 184 to exhaust port 185. Conduit 96 communicates Pk to the rightward end of spool 166 by a port 188 and assists the force of spring 168 in opposing rightward movement of spool 166 under the pressure force of Pg acting on the leftward end thereof. As the wheel speed pressure signal Pg increases during wheel acceleration, the Pk pressure force and spring 168 preload are overcome moving the spool 166 to the right. Pg inlet port 174 is thereby communicated through the outlet port 176 to conduit 96 which is connected through the check valve 98 to the accumulator chamber 88 and the accumulator 80 is recharged with Pg. Simultaneously, the exhaust port 185 is blocked by land 166 and the Pnr inlet port 182 communicates to outlet port 184. Simultaneous communication of Pg to accumulator chamber 88 via check valve 98 and to the rightward end of spool 102 via port 124 pressure balances the control valve spool 102 allowing it to be shifted to its leftward position of FIG. 1 by spring 110. This reestablishes communication of Pb at control valve inlet port 114 to control valve outlet port 118.

The preload of spring 110 returns the control valve spool 102 to its leftward position of FIG. 1 slightly before the wheel speed or Pg recovers to the reference pressure Pu.

HOLD VALVE

The hold valve 194 includes a housing 196 having a bore 198 in which a valve spool 202 is sealingly slidable. Spool 202 is urged to its leftward position of FIG. 1 by a spring 204. At this leftward position, port 206 connected to control valve 100 by conduit 120 is communicated to port 208 which is connected to the rear wheel brakes 120 and 122 by conduit 210. Acceleration valve outlet port 184 is connected to an inlet port 212 at the leftward end of hold valve spool 202 and consequently when spool 166 of acceleration valve 160 is in its rightward position during charging of accumulator 80, Pnr at port 182 is communicated to the leftward end of hold valve 202 causing it to shift rightwardly and block communication between the rear wheel brakes 20 and 22 and the control valve 100. The brake pressure Pb at the wheel brakes 20 and 22 is thereby held constant at its then existing magnitude to provide the hold mode of the interlock cycle during which the wheel continues to accelerate.

The hold valve remains in its rightward position holding the brake pressure as long as the wheel speed or Pg continues to increase. When Pg stops increasing, the spring 168 returns acceleration valve spool 166 to the leftward position exhausting Pnr from the leftward end of hold valve spool 202 through the exhaust 185. Spring 204 can then move hold valve 202 leftwardly to reestablish communication of Pb through control valve 100 and hold valve 194 to reestablish communication between the direct apply valve 34 and the rear wheel brakes 20 and 22. The wheel brake pressure at the rear wheel brakes is thereby increased and the brake apply mode of the interlock cycle is initiated.

CYCLE VALVE

Cycle valve 216 includes a housing 218 having a bore 220 in which a valve spool 222 is sealingly slidable. Spool 222 is urged to its rightward position of FIG. 1 by a spring 224. When the valve spool 222 is in the rightward position of FIG. 1, land 226 communicates Pnr at inlet port 228 to outlet port 230 which is connected to inlet port 174 of acceleration valve 160 and to check valve 130. A second land 232 blocks communication of Pg at a port 234 to the outlet port 230. Pnr in conduit 20 is communicated to an inlet port 236 at the rightward end of spool 222 by an orifice 238 and acts on the rightward end of spool 222 urging it leftwardly. In the leftward position of spool 222, land 226 blocks communication of Pnr at inlet port 228 to the outlet port 230 while Pg at inlet 234 is communicated to the outlet port 230.

THERMOSTATIC VALVE

A thermostatically controlled valve 224 is responsive to temperature of the fluid in the anti-lock control system and is connected in parallel flow relationship with the deceleration orifice 128. The thermostatic valve 244 is closed under normal operation temperatures of the system so that the flow is metered through the deceleration orifice 128. During severe cold weather operation, the viscosity of fluid in the anti-lock brake system impedes its flow rate through the deceleration orifice 128 and may cause the anti-lock system to function even though wheel lock is not impending. Under these conditions, the thermostatic valve 244 opens to bypass the deceleration orifice 128 so that anti-lock control is disabled and communication of brake pressure to the rear wheel brakes is assured.

SYSTEM OPERATION

Engine Start and Brake Application

When the engine is started, the transmission 14 input shaft drives the transmission pump generating pressure Pl in conduit 18. When the direct apply brake valve 34 is actuated by a pedal 40, transmission fluid is communicated to Pb conduit 42 in proportion to the degree of brake valve application. Pb is communicated directly to front wheel brakes 24 and 26 and to the rear wheel brakes 20 and 22 through the control valve 100 and hold valve 194 which are in their normal positions as shown in FIG. 1.

Transmission Shift Into Neutral or Drive Range

When the vehicle operator shifts the transmission 14 into the neutral or drive range, the pressure Pnr results in conduit 20 and is communicated through the cycle valve 216 which is in its rightward position of FIG. 1 to the acceleration valve 160. Pnr acting on the leftward end of acceleration valve spool 166 shifts spool 166 rightwardly so that Pnr is introduced into Pk conduit 96 and thence through check valve 98 to the accumulator chamber 88. The accumulator 80 is thereby charged and diaphragm 86 moved leftwardly. Rightward shifting of acceleration valve spool 166 also communicates Pnr at inlet port 182 to the outlet port 184 and thence to inlet port 212 of hold valve 194. Hold valve spool 202 is thereby shifted rightwardly against the bias of spring 204. Pnr is also communicated to the rightward end of cycle valve spool 222 via orifice 238. After a short period of time as determined by the sizing of orifice 238, the pressure Pnr at the rightward end of spool 222 moves it leftwardly against the bias of spring 224 to block communication of Pnr to cycle valve outlet port 230 and connect the outlet 230 with Pg inlet port 234. Assuming that the vehicle has not yet begun to move, the fluid in accumulator 80 is discharged through orifice 128, or through thermostatic valve 244 in the event of cold weather operation, and through check valve 130 and cycle valve 216 to the transmission governor and the transmission reservoir. Spring 168 will shift acceleration valve 160 which in turn permits spring 204 to shift hold valve 194. It is thus seen that cycle valve 216 acts to exercise the accumulator 80, check valve 98, check valve 130, acceleration valve 160 and hold valve 194 each time the transmission is shifted into neutral or drive range.

Vehicle Acceleration

As the vehicle is driven, average wheel pressure signal Pg is generated by the transmission governor and communicated through conduit 16 and cycle valve 216. At wheel acceleration rates in excess of a threshold level of approximately .5g, as determined by the preload of acceleration valve spring 168, Pg is communicated through the acceleration valve 160 to Pk conduit 96. Pk thus equals Pg and is communicated through check valve 98 to chamber 88 of the accumulator 80. A volume of fluid proportional to the average wheel speed is stored in the accumulator 80 at pressure Pu equal to Pg and Pk. Simultaneously, Pg is communicated to the rightward end of control valve spool 102 to pressure balance the control valve spool and permit spring 110 to hold it in its leftward position of FIG. 1.

During wheel deceleration the wheel speed decreases and thus Pg decreases. It has been determined that a 1.5 g threshold of deceleration orifice 128 corresponds to a wheel deceleration slightly in excess of the maximum deceleration obtainable on the highest wheel-to-road friction coefficient surface encountered in vehicle braking. At wheel decelerations of less than 1.5 g the deceleration orifice 128 accomodates the flow out of accumulator 80 so that the accumulator pressure Pu falls in synchronism with Pk and Pg. Pu in accumulator chamber 88 and Pk acting on the rightward end of valve spool 102 provide balanced opposing forces on the control valve spool 102 whereby spring 110 holds valve spool 102 in its leftward position of FIG. 1 communicating Pb to the rear wheel brakes 20 and 22.

Vehicle Wheel Deceleration in Excess of 1.5 g's

When excess braking pressure from direct apply brake valve 34 is applied to the rear wheel brakes 20 and 22, a brake torque results which is in excess of the torque which the wheel-to-road friction can sustain and excessive wheel slip will be encountered and the anti-lock cycle is initiated.

Figure 2:
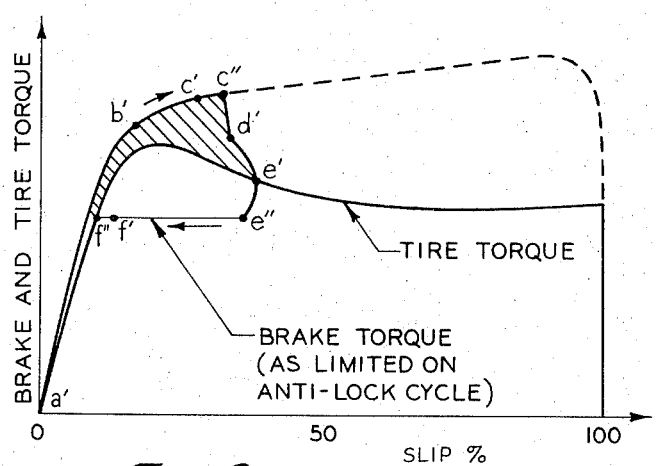
FIG. 2 is a plot of brake and tire torque versus wheel slip.
Figure 3:
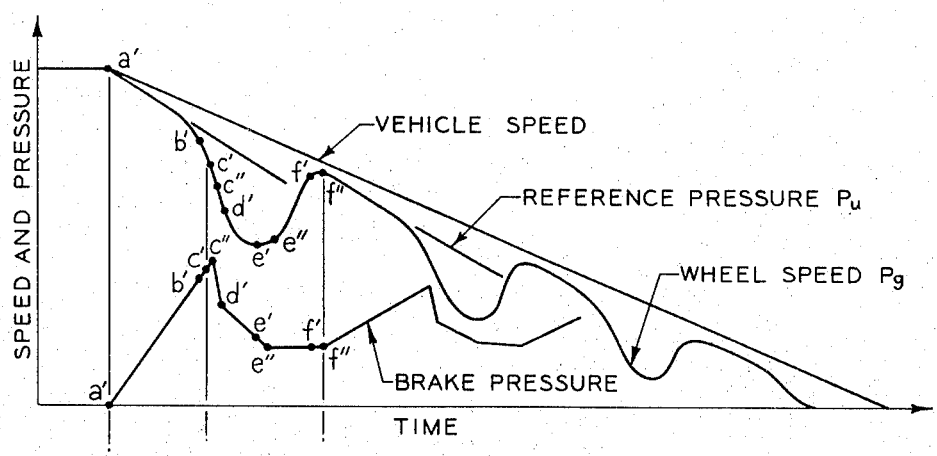
FIG. 3 is a plot of speed and brake pressure versus time.
Figure 4:
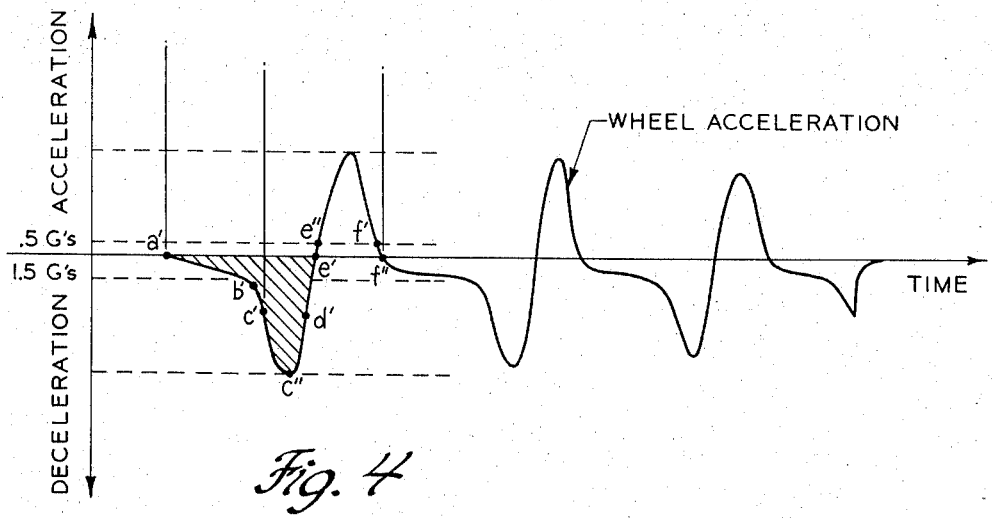
FIG. 4, is a plot of wheel acceleration and deceleration versus time.

For an understanding of the operation of the anti-lock system, reference will be had to FIGS. 2, 3, and 4. FIG. 2 is a plot of brake and tire torque versus wheel slip. As the driver actuates the direct apply valve 34, brake pressure causes the brake torque to increase from point $a^1$ of FIG. 2. The brake torque causes a decrease in wheel speed, and thus a decrease in Pg as seen in the plot of speed and brake pressure versus time of FIG. 3. The velocity difference between the vehicle and the wheel, commonly known as wheel slip, increases with brake torque and generates an increasing tire torque which decelerates the vehicle as shown in FIG. 4, a plot of wheel acceleration and deceleration versus time. As brake pressure (FIG. 3) is increased beyond point $b^1$, a substantial difference begins to develop between the brake and tire torques, and thus between the wheel speed and vehicle speed. If the brake torque is permitted to increase unchecked along the dashed line of FIG. 2, the wheel rapidly approaches the locked or 100 percent slip condition at which the vehicle decelerates by a tire torque considerably less than that available at the peak of the tire torque curve, and accordingly, at a vehicle deceleration rate less than the maximum. The flow rate of oil out of the accumulator 80 as wheel speed and thus Pg decrease is proportional to the wheel deceleration. When the wheel deceleration exceeds the 1½ g equivalent flow rate threshold of deceleration orifice 128, at approximately point $b^1$, on the respective plots, Pg and thus Pk decrease faster than flow out of the accumulator and pressure Pu is able to follow through deceleration orifice 128. The resulting pressure differential between Pu and Pk occuring across deceleration orifice 128 is applied across the spool 122 of the control valve 100. When this differential between Pu and Pk exceeds the preload of spring 110, control valve spool 102 is shifted rightwardly to initiate the release mode of the anti-lock cycle. The flow rate of fluid permitted out of the accumulator through the deceleration orifice 128 as wheel speed and Pg decreases is proportional to the maximum wheel deceleration obtainable on the highest wheel-to-road friction coefficient surface encountered in vehicle braking. The rate at which Pg and Pk decrease is proportional to the actual wheel deceleration occuring during braking. The motion of control valve spool 102 by the Pu–Pk pressure differential is the integral of the relative wheel acceleration flow rates; the control valve spool displacement is thus proportional to the relative wheel velocity. Rightward shifting of control valve spool 102 occurs in the 2 to 4 MPH relative velocity range and blocks communication of Pb to the rear wheel brakes 20 and 22 and opens communication of Pb to exhaust orifice 132 to release the rear wheel brakes 20 and 22. Such movement of control valve spool 102 begins at point $c'$ on the respective plots and after an inherent delay, the brake pressure decrease is effected at $c''$.

The release of brake pressure permits the wheel to begin accelerating to poing $d'$ and then at a slower rate to point $e'$ at which the wheel stops decelerating and begins to accelerate. At point $e''$, the increasing Pg during the wheel acceleration reaches the .5g threshold of acceleration valve 160 and shifts spool 166 thereof rightwardly to open communication of Pg to Pk conduit 96 and begin recharging the accumulator 80. The rightward shifting of acceleration valve 160 also opens communication of Pnr to the hold valve 194, thereby shifting spool 202 of hold valve 194 rightwardly to close communication to rear wheel brakes 20 and 22 to the control valve 100 and hold the then existing Pb at the rear wheel brakes. As the accumulator 80 is recharged with Pg, the pressure differential between Pu and Pk is diminished and spring 110 moves the spool 102 at control valve 100 to its leftward position to re-establish communication of Pb to the hold valve 194. The hold valve 194 remains closed while the wheel speed continues to recover. When the wheel acceleration falls below .5g at point $f'$, indicating that the wheel speed is approaching the vehicle speed, spring 168 shifts acceleration valve spool 166 leftwardly and the pressure at the left end of hold valve spool 202 is exhausted through exhaust port 185. Spring 204 then shifts hold valve spool 202 leftwardly and Pb at the control valve 100 is communicated to the brakes causing a brake pressure increase from poing $f''$ to reapply the brakes 20 and 22.

The anti-lock control system then repeats this release, hold and reapply cycle until the vehicle is brought to a stop or the excessive brake actuation by the vehicle operator is released.

What is claimed is:

1. A vehicle brake system comprising, a source of pressure fluid, operator actuated brake valve means channeling pressure fluid to the wheel brakes for actuation thereof, governor means driven at the speed of the braked wheel and providing fluid at a pressure proportional to wheel speed and a flow rate proportional to wheel acceleration and deceleration, accumulator means, valve means communicating wheel speed proportional pressure fluid to the accumulator means during wheel acceleration to charge the accumulator means, orifice means discharging pressure fluid from the accumulator to the governor during wheel deceleration at a predetermined maximum fluid flow rate to provide a differential between wheel speed proportional pressure and accumulator pressure during wheel deceleration causing a fluid flow rate exceeding the flow threshold of the orifice means, thermostatic valve means connected in parallel flow relationship with the orifice means and effective at fluid temperatures below a predetermined level to unrestrictedly discharge pressure fluid from the accumulator means, and control valve means interposed fluidly intermediate the brake valve means and the braked wheel and operable by the differential between wheel speed proportional pressure and accumulator pressure to selectively release and reapply the braking pressure to the braked wheel as a function of the magnitude of the differential.

2. In a motor vehicle having pump means providing a source of fluid, an automatic transmission providing a not reverse pressure fluid when the transmission is in neutral or a forward drive range and governor means driven in synchronism with the wheels providing fluid at a pressure proportional to the wheel speed and a flow rate proportional to the wheel acceleration or deceleration, a brake system comprising; operator actuated brake apply valve means modulating fluid from the pump means to the wheel brakes for actuation thereof, hydraulic means operative during periods of wheel deceleration at rates in excess of a predetermined optimum rate to provide a reference pressure as a function of the predetermined optimum velocity profile of the wheel during braking, a cycle valve means effective to exercise the hydraulic means with the not reversed pressure for a predetermined time period subsequent to shifting into neutral or drive range and then communicating the wheel speed proportional pressure to the hydraulic means, the hydraulic means including valve means interposed fluidly intermediate the brake valve means and braked wheels and responsive to the differential between the wheel speed proportional pressure and the reference pressure to modulate braking pressure to the braked wheel as a function of the magnitude of the differential.

3. In a motor vehicle having pump means providing a source of fluid, an automatic transmission providing a not reverse pressure fluid when the transmission is in neutral or a forward drive range, a transmission governor means driven in synchronism with the wheels and providing fluid at a pressure proportional to the wheel speed and a flow rate proportional to the wheel acceleration or deceleration, a brake system comprising: operator actuated brake apply valve means modulating fluid from the pump means to the wheel brakes for actuation thereof; accumulator means, check valve means communicating wheel speed proportional pressure fluid to the accumulator means during wheel acceleration to charge the accumulator means, orifice means discharging pressure fluid from the accumulator to the governor during wheel deceleration and at a predetermined maximum fluid flow rate to provide a differential between wheel speed proportional pressure and the accumulator pressure during wheel decelerations which cause fluid flow at a rate exceeding the flow threshold of the orifice means, control valve means interposed fluidly intermediate the brake valve means and the braked wheel and being operable by the differential between wheel speed proportional pressure and accumulator pressure to block fluid communication from the brake apply valve means to the wheel brake and exhaust fluid pressure from the wheel brake, hold valve means effective when actuated to isolate the control valve means from the wheel brake to hold the brake pressure at its then existing condition, acceleration sensing valve means operable during wheel acceleration above a predetermined level to actuate the hold valve means, and cycle valve means effective for a predetermined time period subsequent to shifting of the transmission into neutral or drive range to channel the not reverse pressure to operate the acceleration valve and charge the accumulator with not reverse pressure fluid whereby the acceleration valve means, hold valve means, and accumulator means are cycled each time the transmission is shifted into neutral or drive range.

* * * * *